United States Patent
Wilkes

(10) Patent No.: US 7,913,802 B2
(45) Date of Patent: Mar. 29, 2011

(54) GEAR ASSEMBLIES

(75) Inventor: Mark Anthony Wilkes, Birmingham (GB)

(73) Assignee: TRW Limited (GB)

( * ) Notice: Subject to any disclaimer, the term of this patent is extended or adjusted under 35 U.S.C. 154(b) by 65 days.

(21) Appl. No.: 12/299,068

(22) PCT Filed: May 1, 2007

(86) PCT No.: PCT/GB2007/001581
§ 371 (c)(1),
(2), (4) Date: Jul. 28, 2009

(87) PCT Pub. No.: WO2007/129034
PCT Pub. Date: Nov. 15, 2007

(65) Prior Publication Data
US 2009/0294205 A1   Dec. 3, 2009

(30) Foreign Application Priority Data

May 2, 2006  (GB) .................................. 0608577.3
Jan. 3, 2007  (GB) .................................. 0700052.4

(51) Int. Cl.
*B62D 5/04* (2006.01)
(52) U.S. Cl. .......................... 180/444; 180/443; 180/446
(58) Field of Classification Search ................. 180/444, 180/443, 446
See application file for complete search history.

(56) References Cited

U.S. PATENT DOCUMENTS

| | | | |
|---|---|---|---|
| 3,848,477 A | 11/1974 | Giandinoto et al. | |
| 5,886,437 A | 3/1999 | Bohn et al. | |
| 6,044,723 A | 4/2000 | Eda et al. | |
| 6,491,131 B1 | 12/2002 | Appleyard | |
| 7,100,734 B2 * | 9/2006 | Segawa | 180/444 |
| 7,360,467 B2 * | 4/2008 | Segawa et al. | 74/425 |
| 7,663,273 B2 * | 2/2010 | Shiino et al. | 310/59 |
| 7,748,492 B2 * | 7/2010 | Iwasa et al. | 180/444 |
| 2002/0189892 A1 | 12/2002 | Appleyard | |
| 2004/0163879 A1 | 8/2004 | Segawa | |
| 2007/0193819 A1 | 8/2007 | Iwasa et al. | |

FOREIGN PATENT DOCUMENTS

| | | |
|---|---|---|
| DE | 19513970 A1 | 10/1996 |
| DE | 19822478 A1 | 12/1998 |
| EP | 1637769 A1 | 3/2006 |
| JP | 11098765 A | 4/1999 |
| JP | 2005212559 A | 8/2005 |
| WO | 2005085040 A1 | 9/2005 |

* cited by examiner

*Primary Examiner* — Lesley Morris
*Assistant Examiner* — Marlon A Arce
(74) *Attorney, Agent, or Firm* — MacMillan, Sobanski & Todd, LLC

(57) ABSTRACT

In a gearbox for use in an electric power assisted steering system comprises a housing, an input shaft located at least partially within the housing which carries a worm gear and includes means for coupling to a motor rotor at one end, an output shaft located at least partially within the housing which carries a wheel gear, and a first bearing means which supports the input shaft at a side of the worm distal from the end of the shaft which connects to the motor rotor and second bearing means which supports the input shaft at the other side of the worm, the invention comprises further providing a first biasing means adapted to apply an axial load to the input shaft to bias the axial clearance in the second bearing, the second biasing means acting upon a part of the first bearing means; and a second biasing means adapted to apply a radial load to the input shaft to bias the worm into engagement with the wheel gear, the second biasing means also acting upon a part of the first bearing means.

18 Claims, 7 Drawing Sheets

GEAR ASSEMBLIES

CROSS-REFERENCE TO RELATED APPLICATIONS

This application is a National Stage of International Application No. PCT/GB2007/001581 filed May 1, 2007, the disclosures of which are incorporated herein by reference in entirety, and which claimed priority to Great Britain Patent Application No. 0700052.4 filed Jan. 3, 2007 and Great Britain Patent Application No. 0608577.3 filed May 2, 2006, the disclosures of which are incorporated herein by reference in entirety.

BACKGROUND OF THE INVENTION

This invention relates to improvements in gear assemblies and in particular to gear assemblies for use in electric power assisted steering systems of the kind which incorporate a worm and wheel gear assembly for transferring torque from an electric motor to a steering shaft or output shaft operatively connected thereto.

It is known to provide a power steering system for a vehicle comprising an electric motor having a stator and a rotor, an input shaft operatively connected to the rotor and adapted to rotate therewith, an output shaft associated with a steering shaft, and a gearbox adapted to transfer torque from the input shaft to the output shaft in response to a measure of the torque in the output shaft as produced by a torque sensor. The motor is typically operated to apply an increasing torque to the output shaft as the measured torque increases, thus applying assistance which helps reduce the effort needed to steer the vehicle.

In a simple arrangement the input shaft carries a worm gear, and the output shaft carries a wheel gear. The teeth of the worm and wheel intermesh to transfer the torque. This system is simple and robust whilst providing relatively high gearing with a low component count. There exists, however, a problem in such gearboxes with noise and vibration due to incorrect meshing between the worm and wheel. This may arise due to manufacturing tolerances, thermal changes in dimensions or distortion due to torsional loads and wear during service.

BRIEF SUMMARY OF THE INVENTION

According to a first aspect the invention provides a gearbox assembly for use in an electric power assisted steering system comprising: a housing; an input shaft located at least partially within the housing which carries a worm gear and includes means for coupling to a motor rotor at one end; an output shaft located at least partially within the housing which carries a wheel gear; a first bearing means which supports the input shaft at a side of the worm distal from the end of the shaft which connects to the motor rotor and second bearing means which supports the input shaft at the other side of the worm; and a (first) resilient biasing means adapted to apply an axial load to the input shaft, the resilient biasing means acting upon a part of the first bearing means.

The application of the axial load biases the axial clearance in the second bearing means by which we mean that an axial pre-load is applied to the second bearing which holds the bearing races in place axially and resists any load in the input shaft due to engagement of the worm and wheel which may otherwise cause the second bearing races to move axially relative to one another. The axial clearance in the second bearing is a source of unwanted rattle noise. The contact forces on the teeth of the worm shaft apply an axial load to the input shaft, the direction of which reverses with the direction of rotation of the gear wheel. The application of the axial pre-load from the first biasing means inhibits the axial movement of the second bearing inner race to outer race and hence reduces rattle from the second bearing.

The first biasing means may apply to an axial load greater than the maximum expected axial reaction force that can be created by the flanks of the worm wheel acting on the worm gear.

There may further be an additional (second) biasing means adapted to apply a radial load to the input shaft which may also act upon the first bearing means. The additional biasing means may act between the housing and the first bearing means. It may comprise a leaf spring which is connected to the housing at one end and acts upon the first bearing means, perhaps the outer race, at its other end.

The second biasing means may therefore act to bias the input shaft in a tilting movement (i.e. generally radially with respect to the axis of the shaft), the tilting movement being centred about the second bearing means.

In order to permit the first bearing means to move relative to the housing when subjected to such a tilting load, the second bearing means may be adapted to permit a degree of tilt of the input shaft within the bearing relative to the housing. This tilting bearing is preferably the one closest to the motor to minimise misalignment between motor rotor and input shaft for a given amount of tilt. The bearing may allow an angle of tilt of up +/−0.1 degrees or higher, say up to +/−0.2 degrees or thereabouts.

The first bearing may be so constructed and arranged as to support the worm shaft by resisting only radial loads and not axial loads (over a limited range around a centre point of course), whilst the second bearing may be so constructed and arranged as to resist both axial and radial loads. In each case, the loads will be applied by the movement of the input shaft.

Most preferably, the bearings may be arranged so the input shaft has freedom to articulate in one plane about the second bearing. The orientation of this plane is such that input shaft has freedom to move in and out of mesh with the gearwheel.

The input shaft worm may be biased into mesh with the gearwheel under the load from an additional biasing means which is in the form of a resilient spring such as a leaf spring that may act between the housing and, most preferably, the first bearing.

Where such a leaf spring is provided, the application of the force from the leaf spring forces the worm into mesh with gear wheel removing lash and hence rattle between the flanks of the two sets of gear teeth.

To achieve the desired articulation the first bearing may have freedom to translate relative to the gearbox housing in the said plane. Also the second bearing may have sufficiently large clearances to allow the articulation.

The first resilient biasing means may rotate with the first shaft in which case it acts between the motor rotor and the first shaft.

Alternatively it may be rotationally static in the gearbox housing in which case it acts between the gearbox housing and the outer race of either the first or second bearings.

The first resilient biasing means may apply an axial load to the input shaft in a direction away from the motor. It may do so by applying a tensile or a compressive force, e.g. it may pull the input shaft or push it. In each case, it may act upon the first bearing means. It may be located at the end of the input shaft furthest from the motor.

The resilient biasing means may comprise a part of the first bearing means acting upon a reaction face provided on the input shaft or otherwise being fixed to the input shaft. It may be arranged to pull the input shaft towards the housing or to push it towards the housing. This is convenient as it allows easy assembly and can be retrofitted in some cases by replacing the first bearing means.

Alternatively, it may act between any two parts of the first bearing means, which are fixed relative to the input shaft and housing respectively. In a still further alternative, it may act between the housing and a part of the first bearing means.

The resilient biasing means may comprise a tensile element, for example a tension spring, such as a coil spring or a leaf spring. The spring may be attached to a part of the input shaft via the first bearing at one end or some other element fixed axially relative to the input shaft. It may be fixed to the housing at its other end, or some part that is fixed axially relative to the housing. It could, for example, be attached at each end to different parts of the first bearing assembly.

The resilient biasing means may alternatively be a compressive element such as an elastomeric element or other compressible material. This may comprise a collar of compressible material that acts between a first reaction face fixed relative to the input shaft and a second reaction face fixed relative to the housing. The first reaction face may comprise a part of the first bearing means, for example the outer bearing race, which is fixed axially to the input shaft, the second reaction face comprising a different part of the first bearing means fixed relative to the housing, or even a part of the housing itself.

In a preferred arrangement the second reaction face may comprise a casing of a cartridge that is inserted into the housing. The cartridge casing may house the first bearing means.

An additional linear thrust bearing may be provided between the resilient biasing means and the first reaction face and/or the second reaction face that enables the first bearing means to slide relative to the housing despite the presence of the force applied by the resilient biasing means. The reaction face, thrust bearing and first bearing means may all be provided in a cartridge that can be fixed to the gearbox housing.

The first bearing means may comprise a main bearing assembly fixed axially relative to the input shaft by an end nut screwed onto the input shaft or may be a press fit. It may be located between a first reaction face defined by the end nut threaded onto the end of the input shaft. It could of course be located in position in other ways. The bearing means further includes a bearing cap that provides a second reaction face for the main bearing assembly and locates the bearing race. This second reaction face is provided on the side of the main bearing assembly nearest the worm gear.

A tension tube may be provided which at least partially surrounds the main bearing race and supports at one end the bearing cap, the tension tube extending away from the worm towards the end of the input shaft and defining at its other end a third reaction face upon which the resilient biasing means acts.

In this arrangement, the resilient biasing means comprises a compression spring such as an elastomer spring or rubber block. This acts in compression to push the tension tube away from the worm, in turn pulling on the bearing cap to press the main bearing against the first reaction face and thereby pull the input shaft in a direction away from the end that couples to the motor so as to bias the second bearing and provide an axial pre-load.

The bearing means may additionally include a further bearing assembly comprising a fixed race secured to the gearbox housing and a moving race that is free to move relative to the fixed housing by rolling elements such as balls located between the fixed and moving races to define a thrust bearing, the moving race providing a reaction face for the biasing means, and in which the moving race can move in a direction radial to the axis of the input shaft whilst preventing translation of the moving race orthogonal to the plane of articulation.

The assembly may be so constructed and arranged that the action of tightening the end nut on the input shaft to clamp the first bearing to the shaft applies a preload to the biasing means by compressing the elastomer spring.

In an alternative, instead of providing a biasing means between the end of the tension tube and a third reaction face fixed to the housing that works in compression, a tension spring can be secured at one end to the tension tube. This may be operatively secured at its other end to a part of the gearbox housing or a support bracket fixed to the housing. A hook may be provided at each end of the spring. One hook may engage a hole in the tension tube and the other may hook around a part of the support bracket that is fixed to the housing.

The support bracket may comprise a frame which is a sliding fit within a support collar that is arranged to fit within a complimentary recess in a part of the housing which accommodates the end of the input shaft carrying the first bearing means. A means for adjusting the position of the frame within the collar, effectively drawing the frame into or out of the collar in the main housing, may be provided.

The frame may include a bar which extends orthogonal to the axis of the input shaft. The hook of the spring may be secured to this bar.

The locating bar for the spring may be supported at its ends within half round locating grooves provided in the support frame. A cover may be provided which seals the support frame to the support collar when assembled whilst permitting access to the adjustable fastening. The inside of the cover may be provided with further half round grooves which surround the locating bar to prevent it from slipping out of position. The cover may be a snap fit to the frame.

As described, the frame and its cover are located at least partially within the collar. The adjustable fastening may comprise a bolt which engages a captive nut within a deformable block that is located within an elongated groove in the collar such that rotation of the bolt draws the nut and block towards the collar and away from the housing. This deforms the block to clamp the collar in place in the housing.

As will be appreciated, it is envisaged that the biasing means may be provided as an integral part of the first bearing assembly. This has the advantage that it can be installed or removed in one process as part of the installation of the first bearing assembly. It is also easy to access for maintenance by being located at the free end of the input shaft.

The biasing means may be adjustable to permit a degree of control over the amount of load provided. This could be achieved, where applicable, by adjustment of the position on the end of the input shaft.

It is important to ensure that the meshing force applied between the worm and wheel is not too high since it will cause some friction in the gearbox. This can be achieved by providing a biasing means that has a relatively low load, e.g. spring rate. The skilled man will be able to provide such a suitable load for any given system by trial and error if required or by proving an adjustable biasing means. For example, a meshing force of up to 0.5N measured at the gearwheel is probably acceptable for most electric power steering applications.

The input shaft may be provided with means for connection to the rotor of a motor, and an opening may be provided in the housing to permit connection between motor and input shaft to be effected. The input shaft preferably protrudes through the opening, which also serves to locate the second bearing means. Therefore, in a preferred arrangement the first bearing means is provided at the side of the worm farthest from the motor.

A flexible coupling may be provided between the input shaft and any motor rotor attached to it.

Each of the first bearing means and the second bearing means may comprise two bearing elements rotatably coupled by one or more bearings such a needle bearings or ball bearings. The elements may define bearing races which define the path of the bearings.

According to a second aspect the invention provides an electric power assisted steering system comprising a gearbox assembly according to the first aspect of the invention, an electric motor fixed to the housing and to the input shaft of the gearbox assembly, a steering shaft which is operatively coupled to the output shaft of the gearbox, a torque sensor which is adapted to measure the torque in the output shaft, a controller which adapted to produce a motor control signal according to at least the measured torque, and a motor drive circuit which is adapted to apply a drive signal to the motor in response to the control signal.

Other advantages of this invention will become apparent to those skilled in the art from the following detailed description of the preferred embodiments, when read in light of the accompanying drawings.

DETAILED DESCRIPTION OF THE INVENTION

Figure 1:
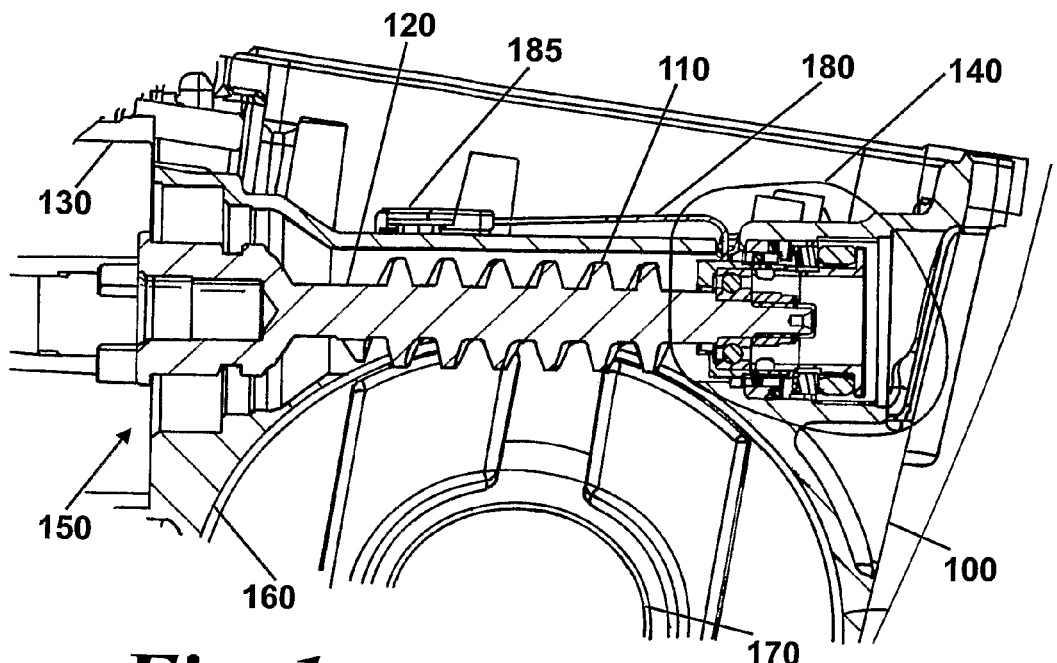
FIG. 1 is a simplified and cut-away partial representation of a first embodiment of a gearbox assembly in accordance with the present invention.

A first embodiment of a gearbox assembly is shown in FIG. 1. It comprises a cast metal housing 100. The housing provides a mating face for a motor which is coupled to a worm gear 110 provided on an input shaft 120 inside the housing. The rotor 130 of the motor can be seen to the left of the Figure. The motor and the housing are secured together by bolts or other fastenings (not shown). The input shaft 120 is supported by two bearing assemblies 140, 150—one towards each end, that are located within recesses in the gearbox housing 100.

A wheel gear 160 is also provided on an output shaft 170 which is also supported by bearings (not shown) on either side of the wheel. Again these bearings are supported in recesses (not shown) in the housing. This output shaft is typically part of a steering shaft which operatively couples a steering wheel to one or more road wheels of a vehicle. The shaft in the Figure extends out of the paper towards the reader.

The teeth of the wheel gear 160 and the worm gear 120 are complementary and intermesh with one another such that rotation of the worm gear 120 by the motor causes the wheel gear 160 to rotate at a lower rate. In this manner rotation produced by the motor is transferred to the steering shaft. By providing for a suitable control for the motor it is possible in this way to provide an assistance torque to the steering to help a driver of the vehicle.

The bearings (not shown) that support the output shaft are substantially fixed relative to the housing to prevent any axial or radial movement of the output shaft carrying the wheel relative to the housing. The bearings 140, 150 that support the input shaft with the worm gear are arranged to provide a degree of movement to the input shaft, and in particular to bias the worm gear into contact with the wheel gear. This is achieved through applying a radial load to the input shaft 120 towards the wheel gear 160. In the example a biasing means in the form of a leaf spring 180 is used. This spring 180 is fixed at one end 185 to the outside of the housing 100 and projects through an opening 186 in the housing 100 onto one of the bearing assemblies—referred to hereinafter as the first bearing means. The bearing 150 nearest the motor is hereinafter referred to as the second bearing means.

As well as applying a radial load to the input shaft 120, the assembly is also designed to apply an axial load to the input shaft to bias the clearance of the second bearing 150. This axial load is achieved in this embodiment by pushing a part of the first bearing means 140 that is fixed to the input shaft 120 away from the motor.

Figure 2:
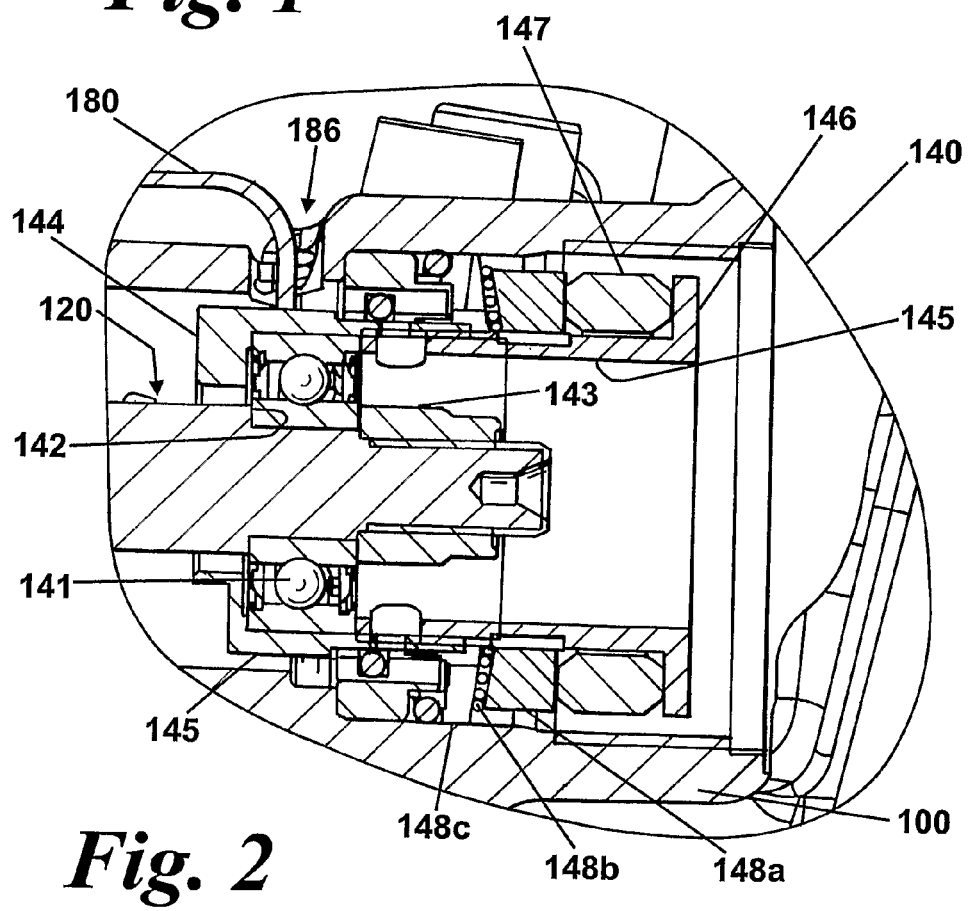
FIG. 2 is a detailed view of a part of the assembly of FIG. 1.
Figure 3:
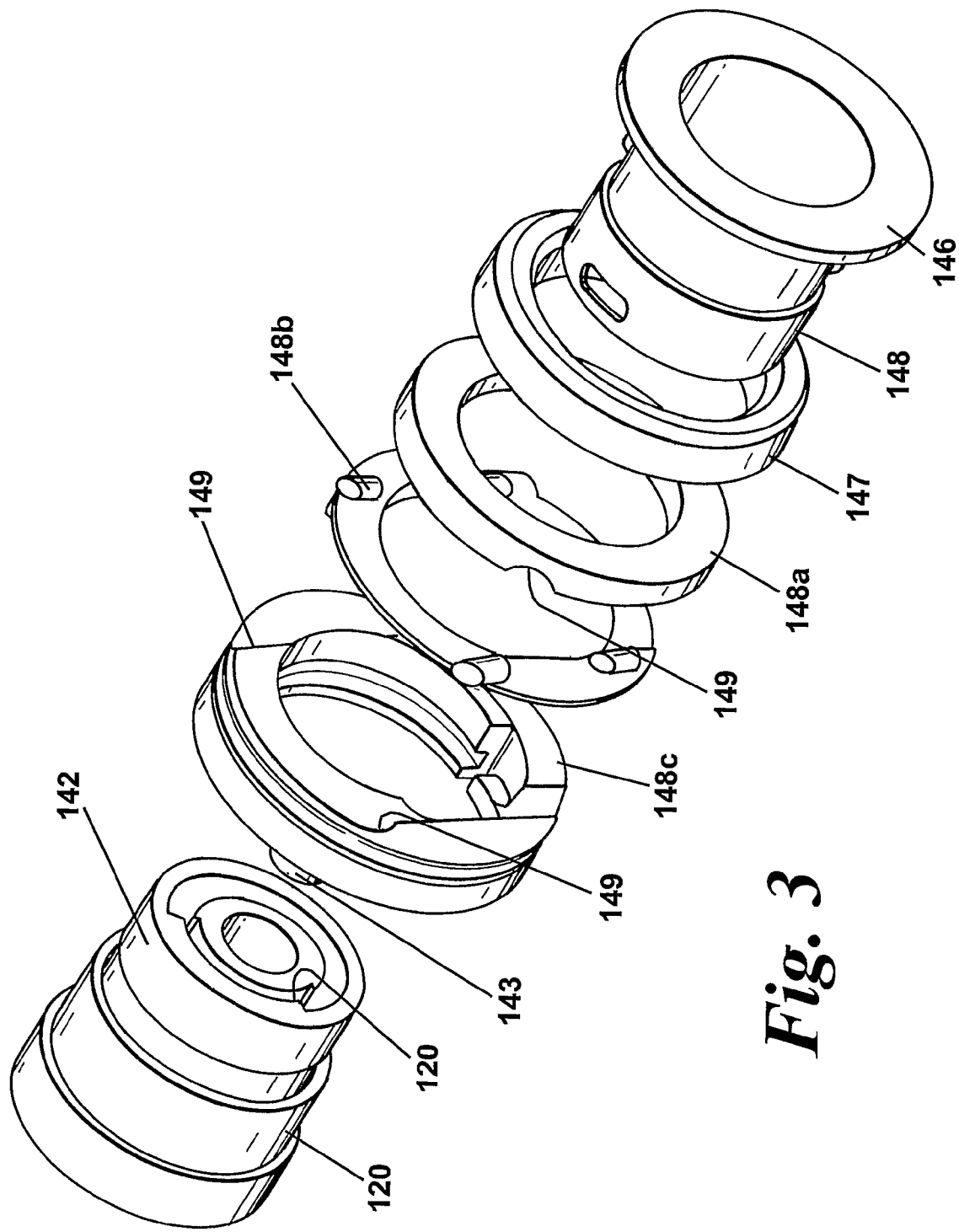
FIG. 3 is an exploded solid view of the component parts of a first bearing means of the assembly shown in FIGS. 1 and 2.

The first bearing means is shown in more detailed in the enlarged view of FIG. 2 and also the exploded view of FIG. 3 of the accompanying drawings. It comprises a main bearing assembly 141 which is located in a space between a reaction face 142 defined by a step change in diameter of the input shaft and a lock end nut 143 which is threaded onto the end of the input shaft 120 to clamp one race of the main bearing assembly in a fixed axial location on the input shaft.

The other race of the main bearing contacts a bearing cap 144 in the form of an annular ring that surrounds the input shaft 120 on the side of the main bearing nearest the worm 110. A tension tube 145 is provided and the bearing cap 144 may be integrally formed with an end of the tube nearest the worm gear. As shown, the cap and tube are separate, interconnectable elements. The cap has an annular ridge that projects inwardly from the tube. The tension tube 145 has an internal diameter greater than that portion of the input shaft that it surrounds and that of the lock nut. The tube 145 extends away from the worm towards the end of the input shaft and defines at its other end an outwardly projecting annular ridge 146 that defines a third reaction face facing the worm gear. This third reaction face provides a surface upon which a resilient reaction means acts.

The resilient biasing means comprises a rubber bush or elastomer spring 147 which fits snugly around the outside of the tension tube 145 adjacent the projecting ridge 146 so as to engage the third reaction face at one end. The elastomer spring 147 has a thickness substantially the same as the collar. The end of the spring distal from the ridge contacts a moving bearing race 148a that surrounds a portion of the tension tube. Notably this moving race is free to slide over the tension tube. Associated with this moving race is a fixed race 148c that is secured to the housing. The fixed race may be a press fit into a recess in the housing 100. Ball bearing cages 148b containing 4 steel balls located between the fixed and moving races, and are located within elongate linear grooves 149 in the two races. These can best be seen in FIG. 3 in which the grooves 149 are clearly visible.

The spacing between the projecting ridge 146 of the tension tube 145 and the moving race 148a together with the free length of the elastomer spring 147 are chosen such that the bush is in compression when in use. Thus, the moving race acting on the fixed race through the steel balls reacts the compressive load in the elastomer spring. As the spring tries to decompress to its free length, it pushes the tension tube away from the worm, in turn pulling on the bearing cap to press the main bearing against the first reaction face and thereby pull the input shaft in a direction away from the end that couples to the motor and into engagement with the wheel gear.

The steel balls 148b in between the fixed and moving races 148c, 148a constrain the moving race, and hence the main bearing, to move relative to the housing in a direction parallel to the grooves in which the bearings are located. The direction of these grooves is chosen to be parallel to a direction in which the load is applied by the leaf spring 180. This allows the leaf spring 180 to load up the first bearing means.

Although not shown in the Figures, the second bearing assembly 150 must be able to accommodate this movement of the input shaft by permitting it to articulate about the second bearing under the force applied by the leaf spring 180.

In an alternative, instead of providing a biasing means between the end of the tension tube and a third reaction face fixed to the housing that works in compression, a tension spring can be secured at one end to the tension tube. This may be operatively secured at its other end to a part of the gearbox housing. A hook may be provided at each end of the spring. One hook may engage a hole in the tension tube and the other may hook around a part of a support member that is fixed to the housing.

Figure 4:
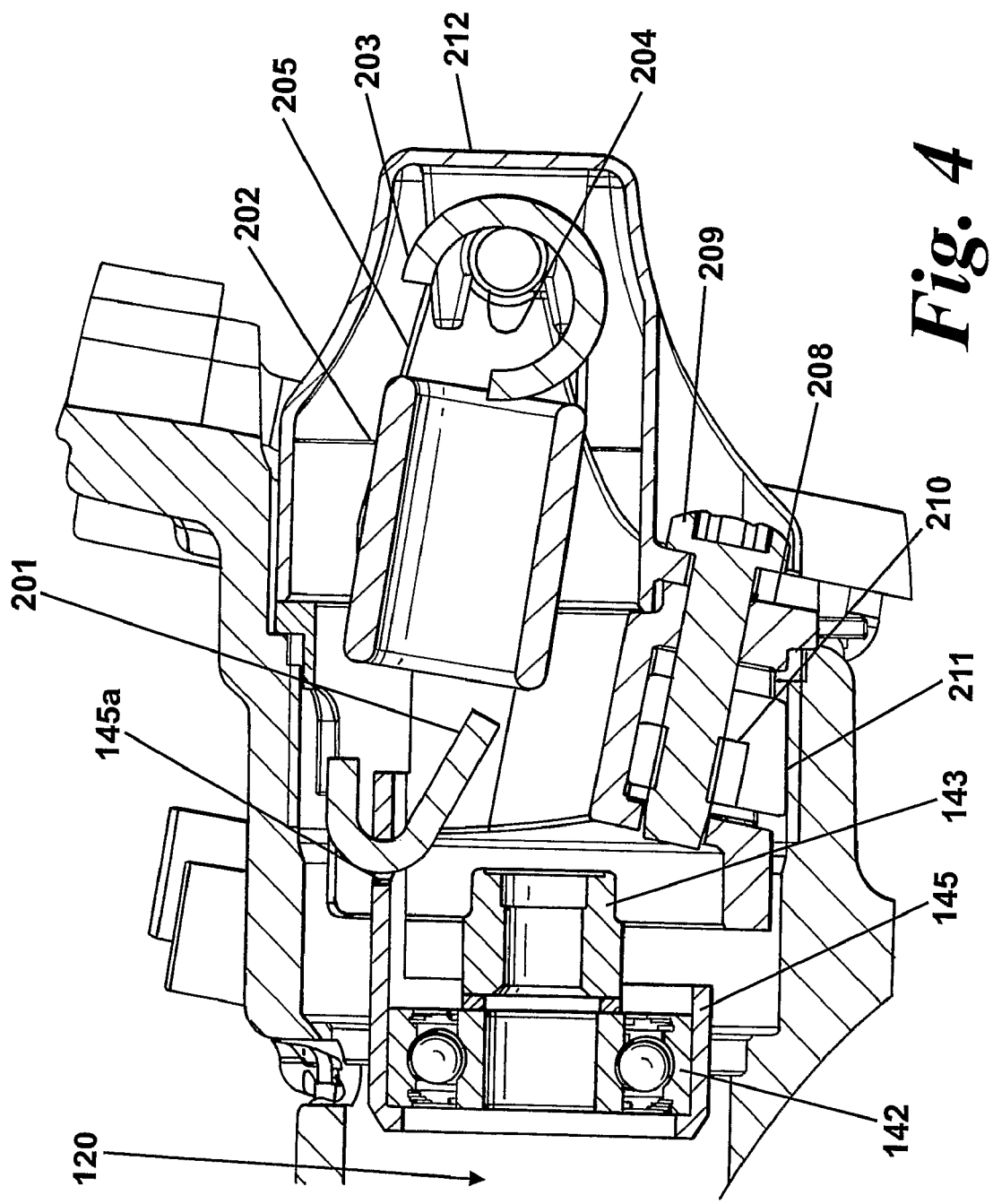
FIG. 4 is a cut-away view of a part of a second embodiment of a gearbox assembly in accordance with the present invention.
Figure 5:
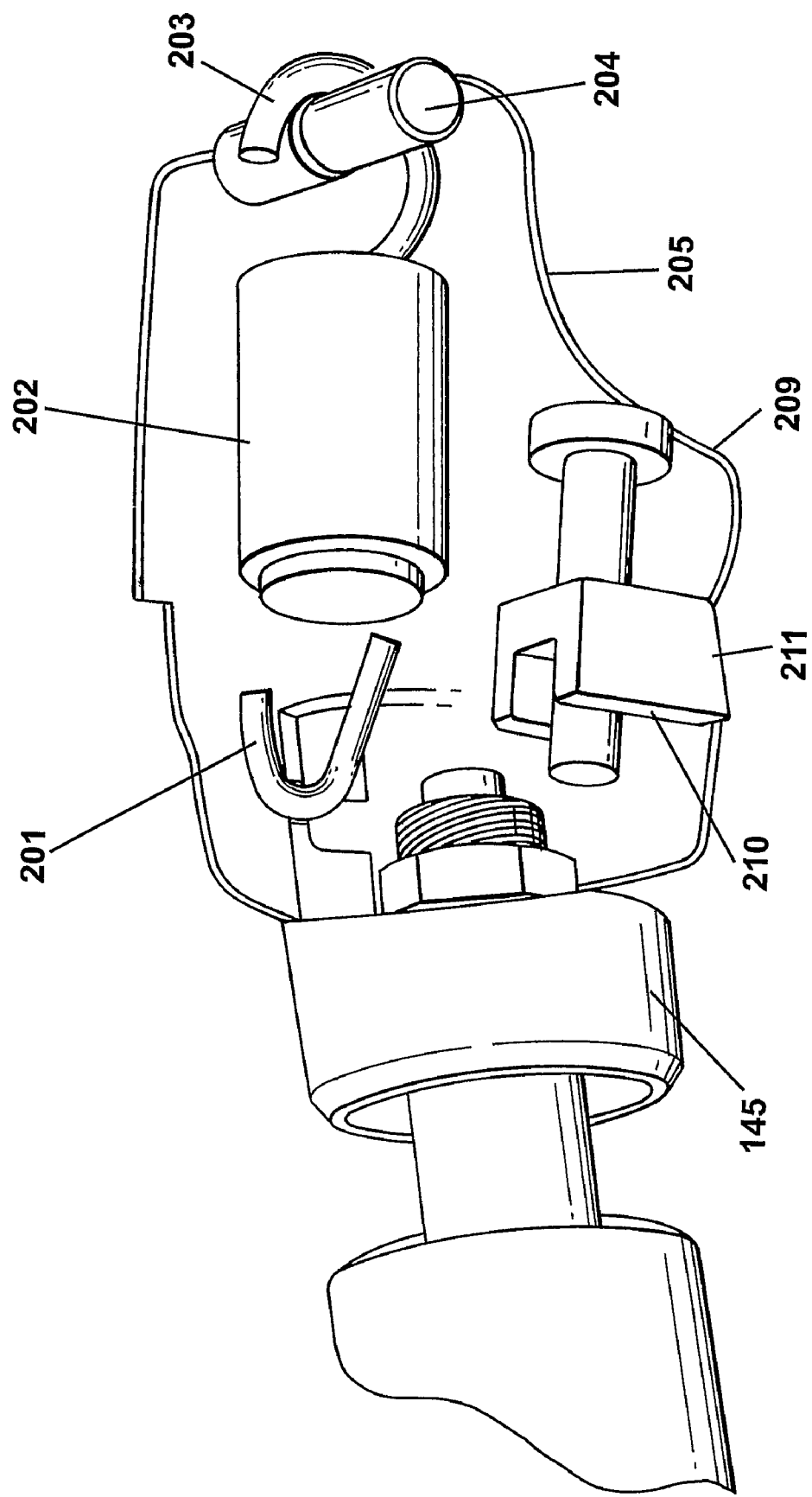
FIG. 5 is an exploded view in solid of several of the internal parts of the first bearing means which is used in the second embodiment of FIG. 4.
Figure 6:
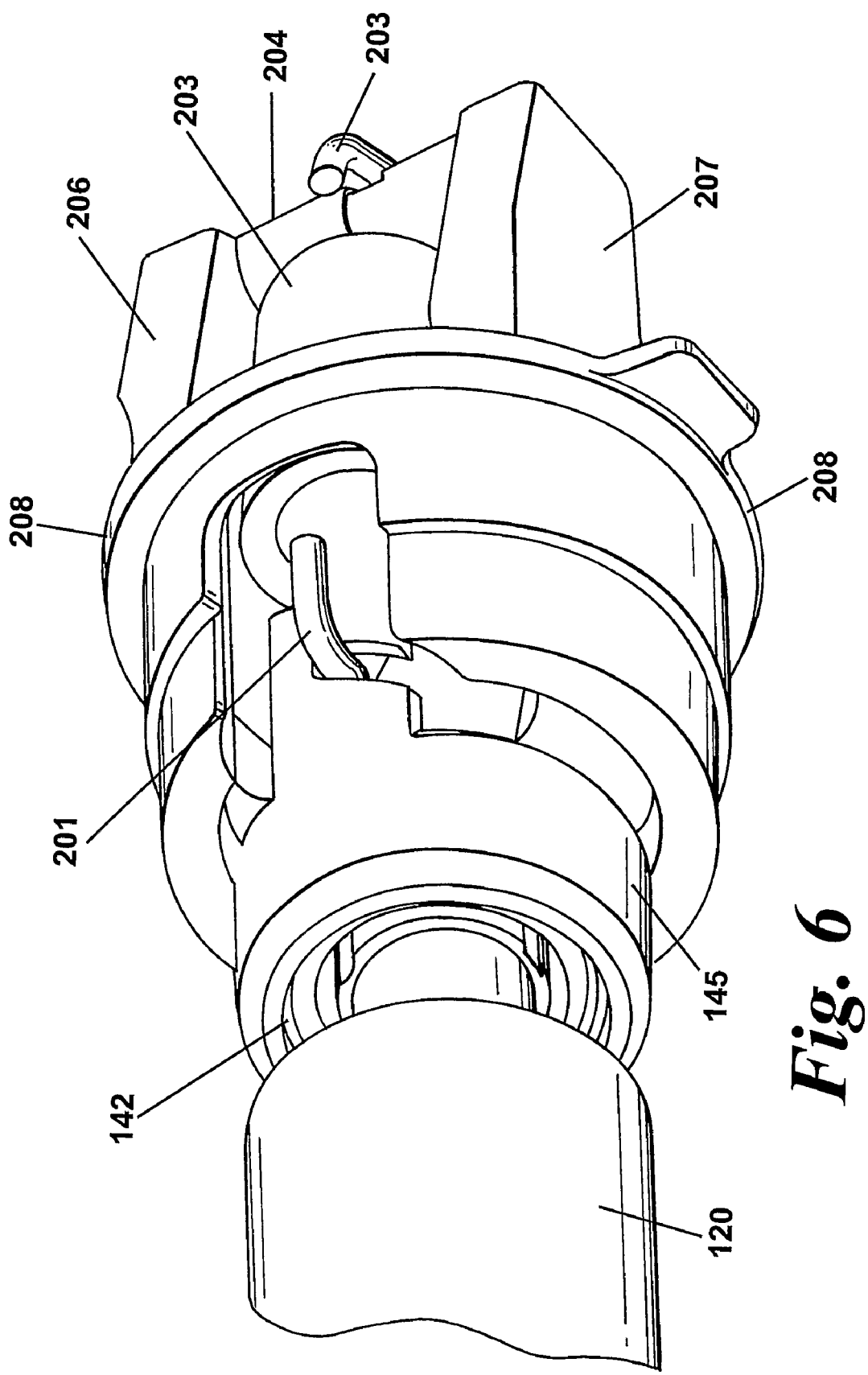
FIG. 6 is an alternative view in solid of the parts of FIG. 5 when assembled.

An embodiment of a first bearing means of this type is shown in FIGS. 4 to 6 of the accompanying drawings. Where possible, parts in common with the first embodiment have been given the same reference numerals.

As with the first embodiment, the main bearing race 142 is secured to the input shaft 120 between a reaction face defined by the shaft and a locking end nut 143. A tension tube 145 defining at one end a bearing cap extends beyond the free end of the shaft. This is provided with an opening 145a onto which is hooked a hook 201 provided at one end of a tension spring 202. The other end of the spring 202 is also provided with a hook 203 which engages a bar 204 supported by a frame 205 of a support member. This support member is operatively coupled to the main housing 100 to react the tension in the spring.

The support bracket comprises a frame 205 having an annular base and two spaced apart support arms 206, 207 extending from it which carry the bar 204. The bar is located within half round grooves in the top of the arms.

The annular base of the frame is a sliding fit within an (optional) support collar 208 that is a press fit within a recess in the main housing 100. A bolt 209 passing through an opening in the frame engages a nut 210 that is captive within a parallel sided tapered plastic block 211 that is in turn located within a parallel sided elongate slot in the frame or support collar. Tightening the bolt pulls the block between the frame and the housing which secures the frame to the housing.

To control the tension, the bolt locks down onto a spacer which fits over the end nut. This determines how far the collar can be pushed into the housing, which sets the tension in the spring.

On assembly a cap 212 is located over the support frame to seal the assembly and prevent unwanted dirt entering the spring or the main bearing.

As will be appreciated, it is envisaged that the biasing means may be provided as an integral part of the first bearing assembly. This has the advantage that it can be installed or removed in one process as part of the installation of the first bearing assembly, and provides a compact self-contained solution to the problem of providing axial loading.

Many modifications could, of course be made whilst remaining within the teachings of the invention. It is to be understood that the use of a leaf spring to provide the tilting force to the input shaft is not essential to the invention. Other types of spring or means for moving the input shaft could be provided.

Figure 7:
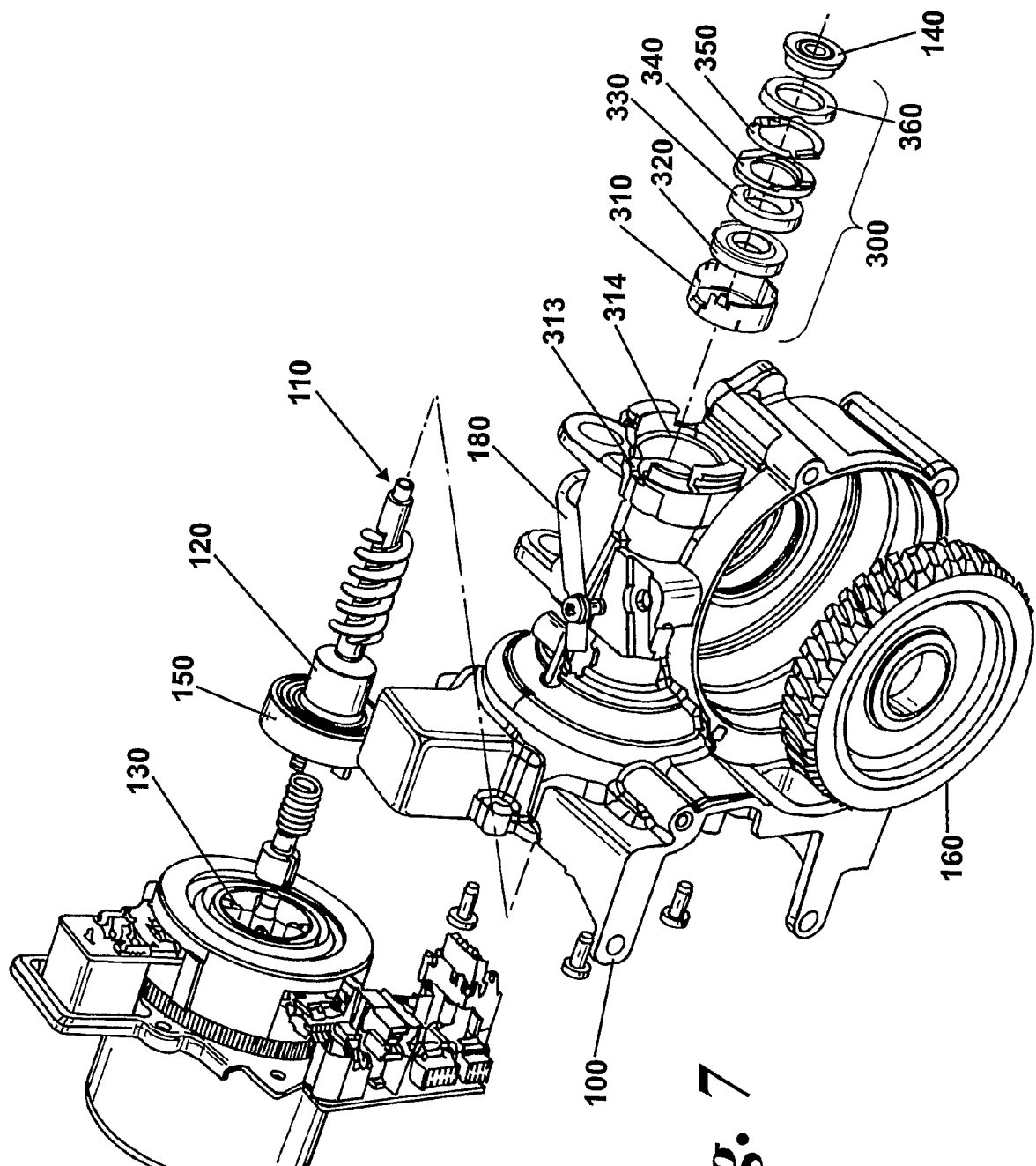
FIG. 7 is an exploded view in solid of a third embodiment of a gearbox assembly including a bearing means and resilient biasing means.
Figure 8A:
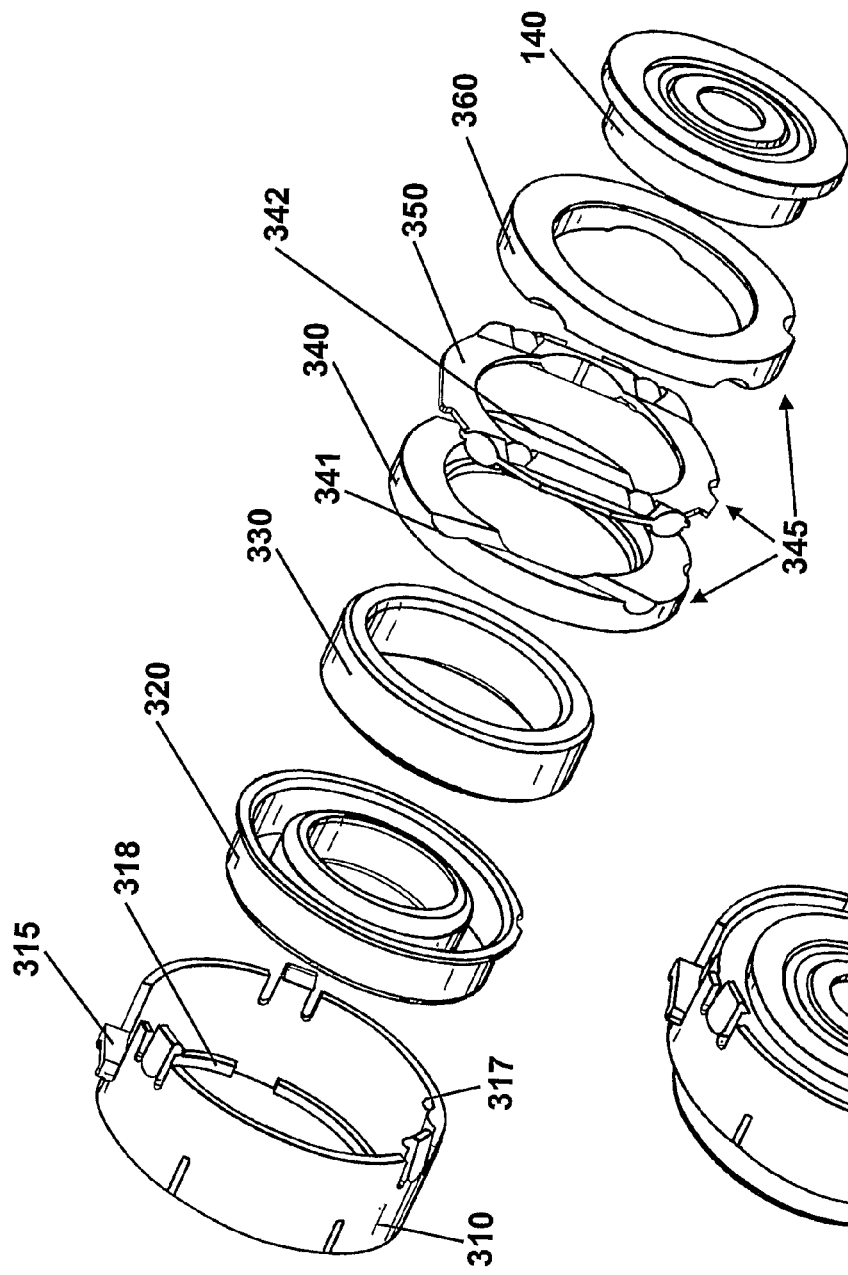
FIG. 8(a) is an enlarged exploded view of the cassette of the third embodiment and 8(b) shows the cartridge when assembled prior to insertion to the gearbox housing.
Figure 8B:
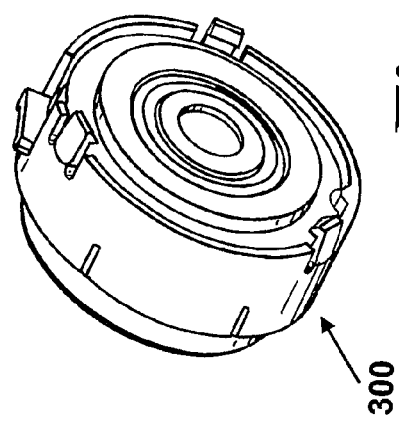

A still further alternative is shown in FIG. 7 of the accompanying drawings. Where possible the same reference numerals used for FIG. 1 have been used to denote like parts. In this arrangement a first bearing means 300 is supported relative to the housing in a cassette body 310. The body 310 is fixed relative to the housing 100 and allows articulation of the input shaft 120 about the second bearing 150 to remove worm to gear clearances as well as providing resilient biasing required to reduce rattle from the second bearing axial clearance. The structure of the cassette 310 can be seen clearly in FIGS. 8(a) and 8(b) of the accompanying drawings.

As shown in FIG. 7 the cassette body 310 locates in housing, the protrusion 315 on the cassette body engages with a slot 313 in the housing to ensure correct orientation. An inwardly directed annular protrusion 318 at the base of the cassette body 310 defines a reaction face and it has annular side walls that together with the base define a void. The hole in the base inside the protrusion allows the input shaft 120 to pass clear through it. Located in the void is a cap 320 which defines a recess into which an annular spring 330 is located. The spring comprises an elastomeric element. On top of the spring 330 is a first annular race 340 of a linear thrust bearing 345. This faces a similar race 360 and is separated from it by four steel balls that are located in a cage 350. The balls run in two parallel grooves 341, 342 in each race 340, 360. The grooves lie in a plane orthogonal to the central axis of the cartridge allowing some radial movement of the moving race 360 relative to the cartridge body 310. Alignment tabs 317 on the wall of the cartridge body co-operate with openings in the bearing races to ensure the grooves are correctly aligned. Finally on top of the moving race is located the first bearing 140 with a light interference fit on the outer diameter of the first bearing and the internal diameter of the moving race. A shoulder on the outer diameter of the first bearing mates with the end face of the moving race. The three latches in the cassette body axially retain the moving race and first bearing sub assembly. This closes the end of the cartridge. The cartridge can be seen assembled in FIG. 8(b) of the accompanying drawings.

Prior to assembly all of the parts are stacked loosely in the cartridge body 310. The input shaft 120 is then passed through the cartridge so it is supported by the first bearing means 140. This bearing 140 is a press fit onto the shaft, and as it continues to be pressed in place it compresses the spring 330 as the components are squashed towards the reaction face 318. Eventually the bearing 140 contacts a shoulder 110 on the shaft 120 and so cannot be pressed in any further. This defines the load on the spring 330.

In use, the cartridge 300 allows the first bearing means 140 to move in the cartridge so the shaft 120 can articulate in one plane in and out of mesh with the gear wheel 160 to take up wear, manufacturing tolerance and dimensional changes with temperature and humidity. The cartridge housing does not move relative to the housing giving a secure location and ensuring the spring load remains relatively constant.

The amount of movement is dictated by the free play between the moving part of the bearing and the wall of the cartridge body.

The compression load in the elastomer spring acts to pull the worm shaft 120 which preloads the second bearing 150 preventing it from generating rattle noise. The compression load also acts to secure the cassette against a shoulder 314 in the housing 100.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

The invention claimed is:

1. A gearbox for use in an electric power assisted steering system comprising:
   a housing;
   an input shaft having first end and a second end, said input shaft being located at least partially within said housing which carries a worm gear and includes coupling means for coupling said input shaft to a motor rotor at said first end;
   an output shaft located at least partially within said housing which carries a wheel gear;
   a first bearing means which supports said input shaft at a first side of said worm distal from said first end of said input shaft and a second bearing means which supports said input shaft at a second side of said worm;
   a first biasing means adapted to apply an axial load to said input shaft to bias an axial clearance in said second bearing means, said first biasing means acting upon a part of said first bearing means; and
   a second biasing means adapted to apply a radial load to said input shaft to bias said worm into engagement with said wheel gear, said second biasing means also acting upon a part of said first bearing means, and wherein said first biasing means pulls said input shaft in a direction away from said motor to bias a clearance in said first bearing means, and further in that a linear thrust bearing is provided between said first biasing means and said first bearing means that permits said first bearing means to slide relative to said housing under the force of said second bearing means.

2. A gearbox assembly according to claim 1 wherein said first biasing means comprises a tensile element.

3. A gearbox assembly according to claim 1 wherein said first biasing means is an element working in compression.

4. A gearbox assembly according to claim 3 wherein said first biasing means comprises a collar of compressible material that acts between a first reaction face fixed relative to said input shaft and a further reaction face fixed relative to said housing.

5. A gearbox assembly according to claim 1 wherein said first bearing means comprises a main bearing assembly fixed axially relative to said input shaft by a threaded end nut screwed on to said input shaft, a bearing cap that provides a reaction face for said main bearing assembly provided on the side of said main bearing assembly nearest said worm gear, a tension tube which at least partially surrounds said main bearing race and is connected at one end to said bearing cap, said tension tube extending away from said worm and defining at its other end a reaction face upon which said first biasing means acts.

6. A gearbox assembly according to claim 5 wherein said first biasing means comprises a compression spring that acts in compression to push said tension tube away from said worm.

7. A gearbox assembly according to claim 5 wherein said first bearing means additionally includes a further bearing assembly comprising a fixed race secured to said gearbox housing and a moving race that is free to move relative to said fixed housing by rolling elements located between said fixed race and said moving races to define a thrust bearing, said biasing means being located in compression between said further bearing assembly and wherein said tension tube reaction face.

8. A gearbox assembly according to claim 5 such that upon at least one of tightening said end nut on said input shaft and pressing said main bearing to clamp said main bearing, said input shaft applies a preload to said first biasing means.

9. A gearbox assembly according to claim 5 wherein a biasing means comprising a tension spring is provided between an end of said tension tube and a reaction face fixed to said housing.

10. A gearbox assembly according to claim 9 wherein said tension spring has a first end which is connected to said tension tube and a second end which is connected to a support bracket secured to said housing by a hook on said second end of said spring.

11. A gearbox assembly according to claim 10 wherein said support bracket comprises a frame which is a sliding fit within a support collar that is arranged to fit within a complimentary recess in a part of said housing which accommodates said end of said input shaft which carries said first bearing means.

12. A gearbox assembly according to claim 11 wherein said input shaft has an axis and said frame includes a locating bar which extends orthogonal to said axis of said input shaft, said hook of said spring being secured to said bar.

13. A gearbox assembly according to claim 12 wherein said support frame includes half round locating grooves and said locating bar for said spring is supported at its ends within said half round locating grooves provided in said support frame.

14. A gearbox assembly according to claims 9 wherein a cover is provided which seals said support frame to said support collar when assembled.

15. A gearbox assembly according to claim 1 wherein said input shaft is provided with means for connection to said motor rotor.

16. A gearbox assembly according to claim 15 wherein said coupling comprises a flexible coupling.

17. A gearbox assembly according to claim 1 wherein said second bearing means is adapted to permit a degree of tilt of said input shaft within said second bearing means relative to said housing.

18. An electric power assisted steering system comprising a gearbox assembly according to claim 1, an electric motor fixed to said housing and to said input shaft of said gearbox assembly, a steering shaft which is operatively coupled to said output shaft of said gearbox assembly, a torque sensor which is adapted to measure torque in said output shaft, a controller which adapted to produce a motor control signal according to at least said measured torque, and a motor drive circuit which is adapted to apply a drive signal to said motor in response to said control signal.

* * * * *